(12) United States Patent
Crivelli et al.

(10) Patent No.: US 11,511,274 B2
(45) Date of Patent: Nov. 29, 2022

(54) LAMINATE FLUIDIC CIRCUIT FOR A FLUID CARTRIDGE

(71) Applicant: ILLUMINA, INC., San Diego, CA (US)

(72) Inventors: Paul Crivelli, San Diego, CA (US); Cyril Delattre, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 70 days.

(21) Appl. No.: 16/641,092

(22) PCT Filed: Nov. 14, 2019

(86) PCT No.: PCT/US2019/061461
§ 371 (c)(1),
(2) Date: Feb. 21, 2020

(87) PCT Pub. No.: WO2020/102521
PCT Pub. Date: May 22, 2020

(65) Prior Publication Data
US 2020/0254450 A1  Aug. 13, 2020

Related U.S. Application Data

(60) Provisional application No. 62/768,278, filed on Nov. 16, 2018.

(51) Int. Cl.
*B01L 3/00* (2006.01)
*G01N 35/10* (2006.01)

(52) U.S. Cl.
CPC ... *B01L 3/502715* (2013.01); *B01L 3/502707* (2013.01); *B01L 3/502738* (2013.01);
(Continued)

(58) Field of Classification Search
CPC ....... B01L 3/502715; B01L 2300/0816; B01L 7/52; B01L 2200/027; B01L 2200/0689;
(Continued)

(56) References Cited

U.S. PATENT DOCUMENTS

| 4,848,722 A | 7/1989 | Webster et al. |
| 6,293,012 B1 | 9/2001 | Moles |

(Continued)

FOREIGN PATENT DOCUMENTS

| CN | 103648649 A | 3/2014 |
| CN | 106065391 | 11/2016 |
| WO | 2012/158997 A1 | 11/2012 |

OTHER PUBLICATIONS

International Search Report and Written Opinion dated Jan. 21, 2020 issued in International application No. PCT/US2019/61461. (14 pages).

*Primary Examiner* — Dean Kwak
(74) *Attorney, Agent, or Firm* — Rothwell, Figg, Ernst & Manbeck, P.C.

(57) ABSTRACT

An apparatus includes a fluid reservoir and a laminate fluidic circuit positioned above the fluid reservoir. The laminate fluidic circuit includes two or more layers laminated together to define a substantially planar substrate and one or more channels defined within the substrate. The laminate fluidic circuit includes a flexible conduit defined by a portion of the substrate encompassing an extent of at least one of the channels that is partially separated or separable from the remainder of the substrate. The flexible conduit is deflectable with respect to the planar substrate toward the fluid reservoir such that the flexible conduit fluidly connects the at least one channel to the fluid reservoir.

18 Claims, 11 Drawing Sheets

(52) U.S. Cl.
CPC ...... *G01N 35/1002* (2013.01); *B01L 2200/12* (2013.01); *B01L 2300/044* (2013.01); *B01L 2300/047* (2013.01); *B01L 2300/0645* (2013.01); *B01L 2300/0816* (2013.01); *B01L 2300/0887* (2013.01); *B01L 2300/12* (2013.01); *B01L 2300/123* (2013.01); *B01L 2400/06* (2013.01)

(58) Field of Classification Search
CPC ....... B01L 2300/0887; B01L 2200/025; B01L 2200/04; B01L 2300/0867; B01L 3/502738; B01L 2300/0877; B01L 2400/0487; B01L 2200/10; B01L 2300/123; B01L 2300/1827; B01L 2400/0655; B01L 2200/16; B01L 2300/022; B01L 2300/041; B01L 9/527; B01L 2300/0874; B01L 3/502784; B01L 2300/0645; B01L 2400/0406; B01L 2200/0636; B01L 2200/0647; B01L 2200/0652; B01L 2200/0673; B01L 2200/0684; B01L 2200/143; B01L 2300/0636; B01L 2300/0663; B01L 2300/0809; B01L 2300/0858; B01L 2300/165; B01L 2300/1805; B01L 2400/0415; B01L 2400/0427; B01L 2400/0439; B01L 2400/0633; B01L 2400/0638; B01L 2400/065; B01L 3/0289; B01L 3/5027; B01L 3/50273; B01L 3/502761; B01L 3/502776; B01L 3/527; B01L 7/525; B01L 2200/026; B01L 2200/06; B01L 2200/0621; B01L 2300/044; B01L 2300/047; B01L 2300/12; B01L 2300/168; B01L 2400/02; B01L 2400/06; B01L 2400/0622; B01L 2400/0688; B01L 2400/086; B01L 2400/088; B01L 3/502746; C12Q 2565/629; C12Q 2563/159; G01N 2021/058; G01N 27/44791; G01N 35/1002; G01N 1/20; G01N 2035/00237; G01N 35/1097; B01J 2219/00353; B01J 2219/00355; B01J 2219/00418; F16K 2099/008; F16K 2099/0084; F16K 99/0015; F16K 99/0028

See application file for complete search history.

(56) References Cited

U.S. PATENT DOCUMENTS

| | | | |
|---|---|---|---|
| 6,321,791 | B1 | 11/2001 | Chow |
| 6,431,212 | B1 * | 8/2002 | Hayenga ............. F16K 99/0046 |
| | | | 137/855 |
| 6,729,352 | B2 | 5/2004 | O'Connor et al. |
| 6,732,567 | B2 | 5/2004 | Briscoe et al. |
| 6,793,753 | B2 | 9/2004 | Unger et al. |
| 6,845,787 | B2 | 2/2005 | Karp et al. |
| 6,981,522 | B2 | 1/2006 | O'Connor et al. |
| 7,069,952 | B1 | 7/2006 | McReynolds et al. |
| 7,097,809 | B2 | 8/2006 | Van Dam et al. |
| 7,235,400 | B2 | 6/2007 | Adey |
| 7,241,420 | B2 * | 7/2007 | Hantschel ............. B01L 3/0255 |
| | | | 400/124.32 |
| 7,390,457 | B2 | 6/2008 | Schembri |
| 7,402,279 | B2 | 7/2008 | Schembri |
| 7,476,363 | B2 | 1/2009 | Unger et al. |
| 7,608,160 | B2 | 10/2009 | Zhou et al. |
| 8,080,221 | B2 * | 12/2011 | Hantschel ............. B01L 3/0255 |
| | | | 422/507 |
| 8,388,908 | B2 | 3/2013 | Blaga et al. |
| 8,475,743 | B2 | 7/2013 | Facer et al. |
| 8,573,259 | B2 | 11/2013 | Burns et al. |
| 8,758,704 | B2 | 6/2014 | Baril |
| 8,900,955 | B2 | 12/2014 | Cain et al. |
| 8,945,484 | B2 | 2/2015 | Namkoong et al. |
| 8,951,825 | B1 * | 2/2015 | Limb ...................... H01L 31/18 |
| | | | 438/71 |
| 9,209,400 | B2 | 12/2015 | Hayton et al. |
| 9,644,623 | B2 | 5/2017 | Mathies et al. |
| 9,725,762 | B2 * | 8/2017 | Ludowise .......... G01N 21/6486 |
| 9,759,718 | B2 | 9/2017 | Putnam et al. |
| 9,777,317 | B2 | 10/2017 | Spoto et al. |
| 2002/0168278 | A1 * | 11/2002 | Jeon .................... F16K 99/0048 |
| | | | 417/559 |
| 2008/0123171 | A1 * | 5/2008 | Dausch ............... F16K 99/0001 |
| | | | 359/230 |
| 2008/0218934 | A1 * | 9/2008 | Langereis ............ B81C 1/00182 |
| | | | 361/283.1 |
| 2009/0202391 | A1 | 8/2009 | Hagiwara et al. |
| 2009/0291507 | A1 | 11/2009 | Clemmens et al. |
| 2010/0213161 | A1 | 8/2010 | Hantschel et al. |
| 2012/0177543 | A1 * | 7/2012 | Battrell ............. B01L 3/502738 |
| | | | 422/187 |
| 2013/0118621 | A1 | 5/2013 | Weber et al. |
| 2015/0024373 | A1 | 1/2015 | Xia et al. |
| 2016/0035764 | A1 | 2/2016 | Watts |
| 2016/0319350 | A1 | 11/2016 | Stone et al. |
| 2017/0106369 | A1 | 4/2017 | Asogawa et al. |

* cited by examiner

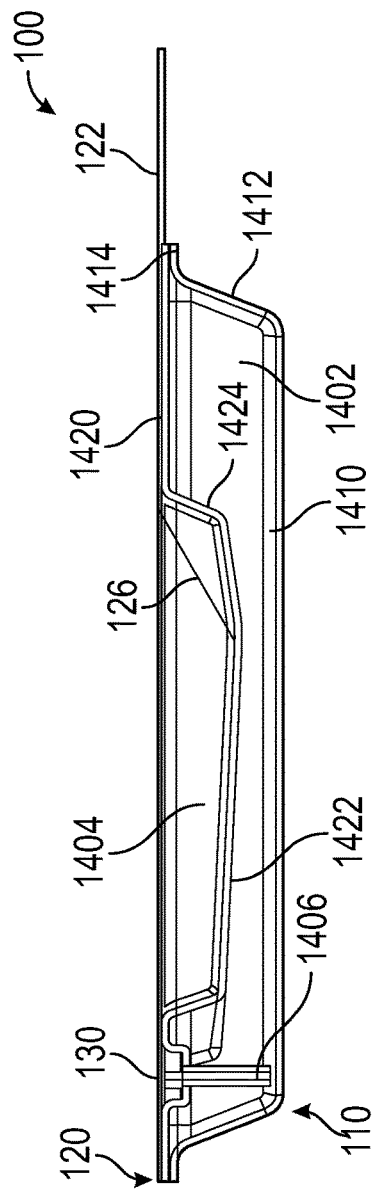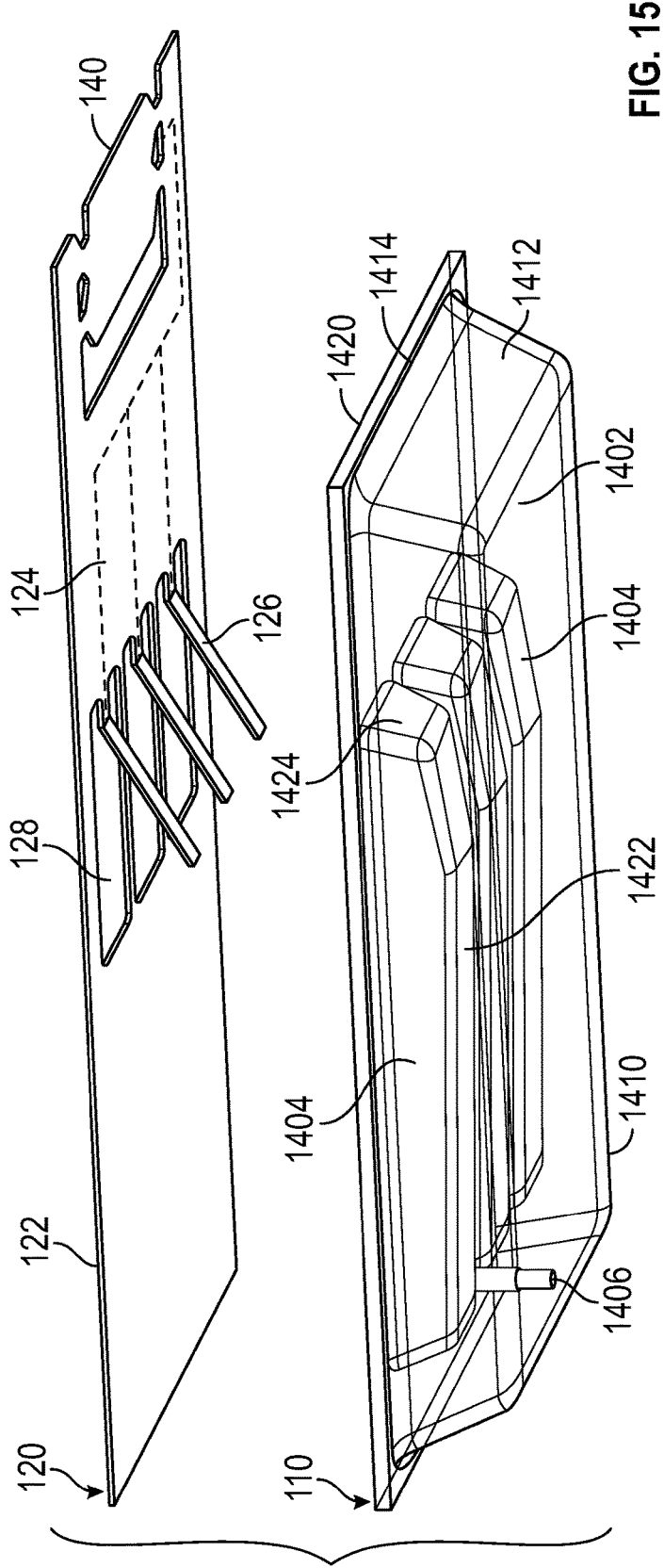

LAMINATE FLUIDIC CIRCUIT FOR A FLUID CARTRIDGE

CROSS REFERENCE TO RELATED APPLICATION(S)

This application is a 35 U.S.C. § 371 National Stage of International Patent Application No. PCT/US2019/61461, filed Nov. 14, 2019, designating the United States and claiming priority to U.S. provisional application no. 62/768,278, filed on Nov. 16, 2018. The above identified applications are incorporated by reference.

BACKGROUND

Various assay protocols for clinical and molecular processes are implemented by installing cartridges holding various types of fluids into a processing instrument (e.g., sequencer), where the various types of fluids are selectively delivered to a fluidic device to conduct one or more fluid operations, such as mixing, processing, reaction, detection, etc. Typically, the cartridges include various fluidic elements, such as pumps, channels, manifolds, and valves, to allow the processing instrument to meter out and deliver a selected fluid to the fluidic device. To provide the cartridge all the necessary fluidic elements, some cartridges are formed out of an injected molded plastic body, in which grooves are formed along the surface of the plastic body and sealed by a plastic film or a foil that is applied over the surface of the plastic body to form fluid channels within the cartridge. However, forming the cartridge out of a rigid plastic body, such as an injected molded plastic, can result in a longer development cycle.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass an apparatus comprising a fluid reservoir and a laminate fluidic circuit positioned above the fluid reservoir. The laminate fluidic circuit comprises two or more layers laminated together to define a substantially planar substrate, one or more channels defined within the substrate, and a flexible conduit defined by a portion of the substrate encompassing an extent of at least one of the channels that is partially separated or separable from the remainder of the substrate. The flexible conduit comprises the portion of the substrate and the encompassed extent of the channel. The flexible conduit is deflectable with respect to the planar substrate toward the fluid reservoir such that the flexible conduit fluidly connects the at least one channel to the fluid reservoir.

Aspects of the disclosure encompass an method comprising a process of forming a channel in a the first layer, a process of laminating one or more layers to the first layer to form a planar, multilayer substrate such that the channel is defined within the substrate, and a process of disrupting a portion of the substrate encompassing an extent of the channel so that the disrupted portion is partially separated or separable from the remainder of the substrate to form a flexible conduit comprising the portion of the substrate and the encompassed extent of the channel, wherein the flexible conduit is deflectable with respect to the planar substrate.

In some examples the process of forming the channel in the first layer comprises forming a groove in a surface of the first layer, and the one or more layers laminated to the first layer encloses the groove. In some examples, the process of forming the channel in the first layer comprises forming a slot through the first layer, and the one or more layers laminated to the first layer encloses the slot.

Aspects of the disclosure encompass an apparatus comprising two or more layers laminated together to define a substantially planar substrate; one or more channels defined within the substrate, and a flexible conduit defined by a portion of the substrate encompassing an extent of at least one of the channels that is partially separated or separable from the remainder of the substrate. The flexible conduit comprising the portion of the substrate and the encompassed extent of the channel, wherein the flexible conduit is deflectable with respect to the planar substrate.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

FIG. 14 is a side view of the apparatus comprising a laminate fluidic circuit and a tray that includes a first fluid reservoir and a plurality of second fluid reservoirs disposed within the first fluid reservoir.

FIG. 15 is an exploded view of the apparatus shown in FIG. 14.

DETAILED DESCRIPTION

Figure 1:
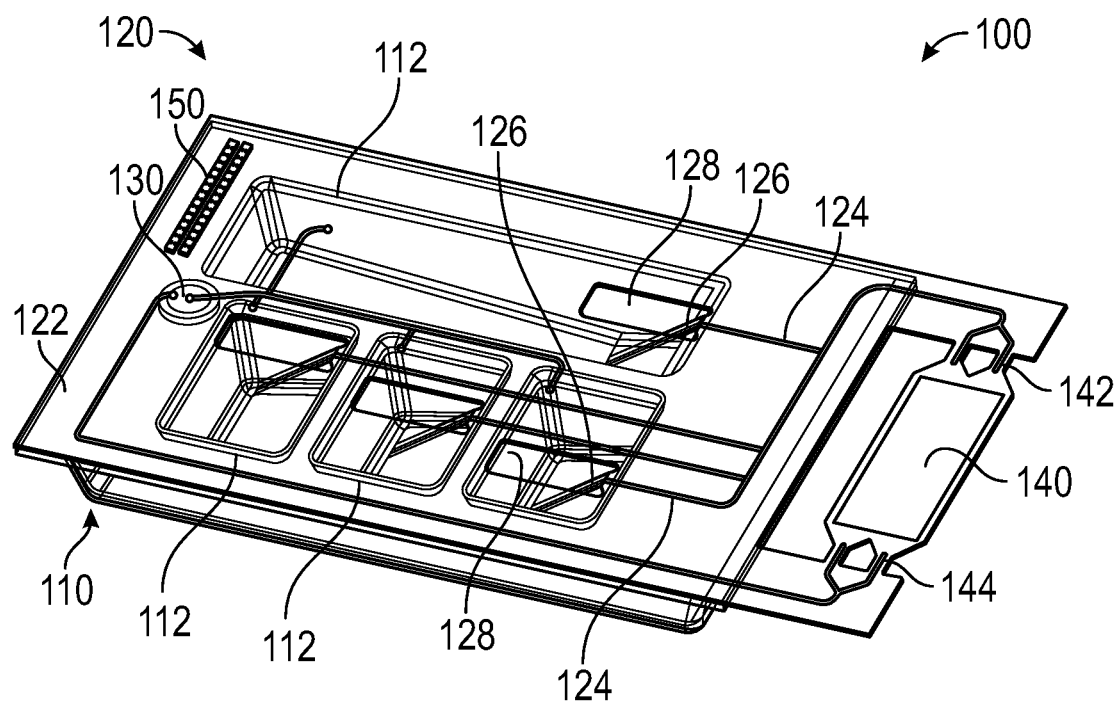
FIG. 1 is a perspective view of an apparatus comprising a laminate fluidic circuit covering a tray that includes a plurality of fluid reservoirs.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

According to various examples, assemblies and devices as described herein may be used in combination with a fluid cartridge that may comprise one or more fluid processing passageways including one or more elements, for example, one or more of a channel, a branch channel, a valve, a flow splitter, a vent, a port, an access area, a via, a bead, a reagent containing bead, a cover layer, a reaction component, any combination thereof, and the like. Any element may be in fluid communication with another element.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

The term "lyophilization" refers to a dehydration process that is typically used to preserve a perishable material and/or facilitate transport thereof. Conditions for lyophilization may include subjecting a liquid material and/or a vessel containing the liquid material to freezing conditions while reducing the surrounding pressure to allow the frozen water within the material to sublimate directly from the solid phase to the gas phase. Such freezing conditions may include cooling the material below the lowest temperature at which the solid and liquid phases thereof can coexist (known in the art as the "triple point"). Usually, the freezing temperatures are between −50° C. and −80° C., however, one of skill in the art can determine the appropriate freezing temperature to lyophilize the reagent for use in the automated biochemical assay.

Fluid Cartridge

There is a need for improved fluid cartridge apparatuses that allow modifications to the design of the fluidic circuit to be implemented quickly without substantively extending the development cycle of the fluidic cartridge. An improved fluidic cartridge may include reagent reservoirs below corresponding fluidic circuits, thereby eliminating valving that may be implemented for cartridge designs storing reagents above the fluidic circuit. Such a design can enable the fluidic cartridge to transport reagents in liquid form as the position of the fluidic circuit with respect to the reagent reservoirs limits or stops the egress of the reagent.

According to various examples, an apparatus comprises a fluid cartridge holding various types of fluids (e.g., reagents, buffer, reaction media) and configured to interface with a fluid processing instrument, such that the fluid cartridge allows the stored fluids to be selectively delivered to a region of interest to undergo one or more fluid operations (e.g., mixing, processing, reaction, detection). The fluid cartridge comprises at least one fluid reservoir for holding a fluid and a laminate fluidic circuit positioned above the fluid reservoir. The laminate fluidic circuit comprises a substantially planar, multilayer substrate, one or more channels defined within the multilayer substrate, and a flexible conduit defined by a portion of the multilayer substrate that encompasses an extent of a respective channel and is partially separated or separable from the remainder of the substrate, such that the flexible conduit is configured to be deflected with respect to the multilayer substrate toward the fluid reservoir to fluidly connect the one or more channels to the fluid reservoir. Accordingly, the laminate fluidic circuit allows fluid to be stored below the multilayer substrate. Furthermore, the laminate fluidic circuit allows modifications to be easily applied to the multilayer substrate by adding more layers to the substrate and forming more channels out of the additional layers.

As shown in FIG. 1, an example apparatus comprises a fluid cartridge 100 for holding and directing various types of fluids for a fluid operation. In some examples, the fluid cartridge 100 comprises a tray 110 defining one or more fluid reservoirs for holding the various types of fluids and a laminate fluidic circuit 120 operatively mounted on the tray 110 such that laminate fluidic circuit 120 allows the various types of fluids held in the tray 110 to be directed from the one or more fluid reservoirs to be used for one or more fluid operations.

In various examples, the tray 110 comprises one or more fluid reservoirs 112, in which each fluid reservoir 112 holds a fluid that is intended to be used during a designated fluid operation. In some examples, each fluid reservoir 112 comprises a bottom and one or more walls extending from the bottom, such that the fluid reservoir 112 encloses a space to hold a fluid. In some examples, the reservoirs 112 may have variable sizes depending on the volume of the fluid to be used for a designated fluid operation.

In various examples, the laminate fluidic circuit 120 comprises a substantially planar, multilayer substrate 122 that is configured to be mounted on the tray 110 and be disposed above the fluid reservoir(s) 112. In various examples, the laminate fluidic circuit 120 comprises one or more channels 124 defined within the multilayer substrate 122 that transmit fluid within the substrate 122 and to other devices fluidly connected to laminate fluidic circuit 120. In various examples, the laminate fluidic circuit 120 comprises one or more flexible conduits 126 that fluidly connect the channels 124 to the fluid reservoirs 112 of the tray 110 when deflected into the fluid reservoirs 112. In various examples, the flexible conduits 126 are configured to permit fluid to be aspirated from an associated fluid reservoir 112, such that the fluid held in the fluid reservoir 112 may be transmitted to the channels 124 disposed within the multilayer substrate 122. In various examples, the dimensions of the channels 124 and the flexible conduit 126 may include high aspect ratios (e.g., length/inner diameter ≥5) to promote more efficient fluid flow through the laminate fluidic circuit. In various examples, the length of the flexible conduit 126 is selected so that the flexible conduit 126 reaches the bottom of fluid reservoirs 112 to ensure complete extraction of fluid reagents held in the fluid reservoir 112. In some examples, each flexible conduit 126 can contain more than one channel 124 therein. For instance, each flexible conduit 126 can include two channels 124, such as an inlet channel and an outlet channel. The inlet channel can introduce a fluid, such as another reagent or air, to the fluid contained within the corresponding fluid reservoir 112. In some instances, the inlet channel can introduce more than one reagent into the corresponding fluid reservoir 112 to utilize the fluid reservoir 112 as a mixing reservoir. In some instances, the inlet channel can introduce air into the corresponding fluid reservoir 112. The introduced air can be used to bubble, mix, and/or pressurize the fluid within the corresponding fluid reservoir 112. In some instances, a heated or cooled volume of air can be introduced to control the temperature of the fluid therein.

In some examples, the flexible conduits 126 are defined by one or more cutouts 128 formed through the multilayer substrate 122. Each cutout 128 partially surrounds a portion of the multilayer substrate 122 encompassing an extent of a respective channel 124, such that the portion of the substrate 122 is partially separated from the remainder of the substrate 122. Each flexible conduit 126 is defined by the portion of the multilayer substrate 122 partially separated from the remainder of the substrate 122 and encompassing the extent of the respective channel 124.

When the laminate fluidic circuit 120 is operatively mounted on the tray 110, the multilayer substrate 122 is aligned to the tray 110 in a way that places each cutout 128 and flexible conduit 126 above a corresponding fluid reservoir 112. In various examples, the flexible conduit 126 is configured to be deflected (e.g., manually or by an automated device) with respect to the multilayer substrate 122 toward its corresponding fluid reservoir 112. When deflected toward its corresponding fluid reservoir 112, the flexible conduit 126 fluidly connects the respective channel 124 to its associated fluid reservoir 112. The deflection of the flexible conduit 126 can include bowing, bending, curving, or otherwise moving at least a portion of the flexible conduit into the fluid reservoir 112 while the channel within the flexible conduit 126 remains intact to allow fluid flow of fluid from within the fluid reservoir 112, through the channel in the flexible conduit 126, and into one or more channels 124 of the multilayer substrate 122.

In various examples, the laminate fluidic circuit 120 comprises a port 130 fluidly connected to one of the fluid reservoirs 112 that is not exposed by one of the cutouts 128. In some examples, the port 130 comprises an opening formed through multilayer substrate 122 and fluidly connected to the one or more channels 124.

In various examples, the fluid cartridge 100 comprises a fluidic device 140 (e.g., flow cell) fluidly connected to the one or more channels 124 such that the laminate fluidic circuit 120 allows fluid to be selectively transmitted between the fluid reservoirs 112 and the fluidic device 140. In various examples, the fluidic device 140 may include a fluid inlet 142 connected to one of the channels 124, a fluid outlet 144 connected to one of the channels 124, and/or one or more fluid passages (not shown) fluidly connected to the fluid inlet 142 and the fluid outlet 144 to allow fluid processing, such as a chemical or biochemical assay or other reaction, to take place. In various examples, the fluidic device 140 is configured to allow the introduction of various types of fluids (e.g., reagents, buffers, reaction media) into the fluid inlet 142 to undergo fluid processing within the one or more fluid passages. In various examples, fluidic device 140 is further configured to allow the various types of fluids to be flushed out of the one or more fluid passages through the fluid outlet 144.

The fluidic device 140 may be an integral part of the laminate fluidic circuit 120, the fluidic device 140 may be removably attached or coupled to the laminate fluidic circuit 120, (e.g., via fluidic connectors connecting the fluid inlet 142 and fluid outlet 144 to the channels 124 defined within the substrate 122), and/or the fluidic device 140 may be a separate device that is positioned remote from the laminate fluidic circuit 120.

Figure 6:
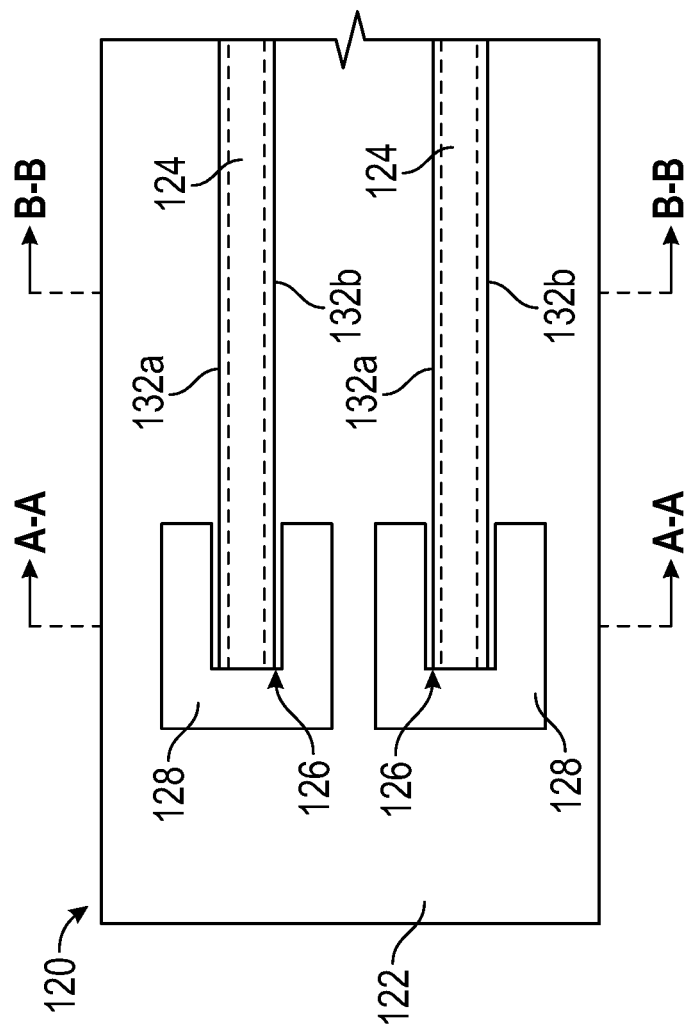
FIG. 6 is a schematic partial top view of an example laminate fluidic circuit comprising a multilayer substrate that includes flexible conduits formed by cutouts.
Figure 7:
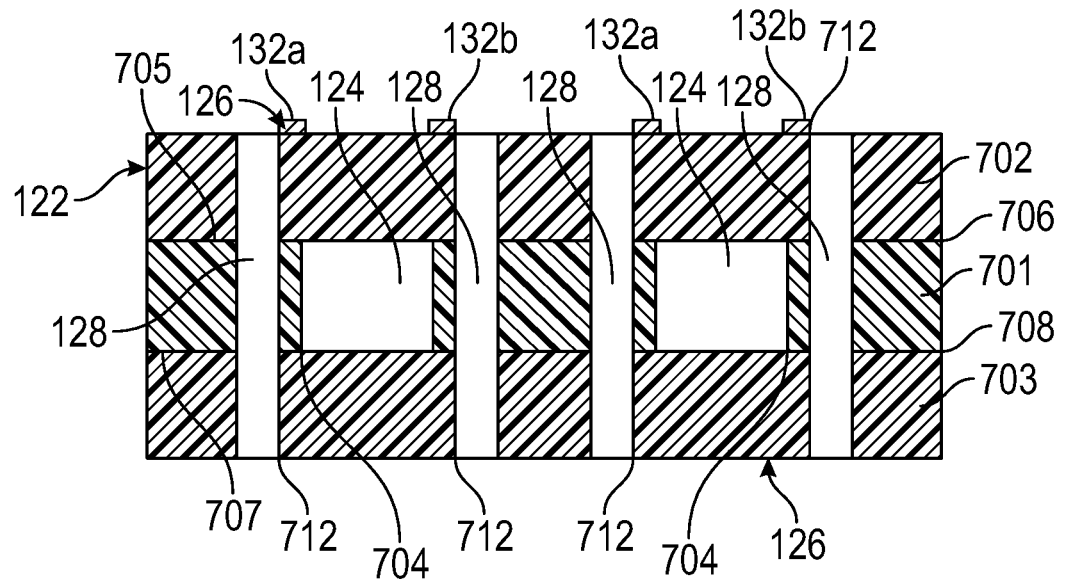
FIG. 7 is a schematic cross-sectional view of an example laminate fluidic circuit taken along line A-A in FIG. 6.
Figure 8:
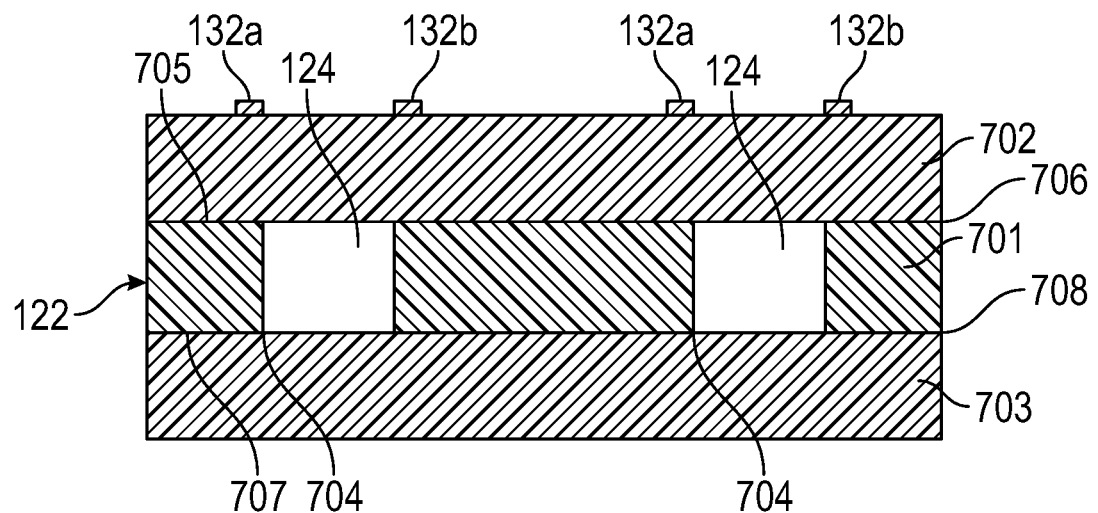
FIG. 8 is a schematic cross-sectional view of the example laminate fluidic circuit taken along line B-B in FIG. 6.

In some examples, the laminate fluidic circuit 120 comprises one or more electrical contacts 150 disposed along the multilayer substrate 122 and configured to receive power from a power source. In some examples, the laminate fluidic circuit 120 comprises one or more electrodes (not shown) disposed on the flexible conduit 126 and electrically connected to the electrical contacts 150 via one or more electric paths formed in and/or on the laminate fluidic circuit 120. In some examples, as shown in FIGS. 6-8, each flexible conduit 126 comprises at least two electrodes 132a, 132b that serve as terminals in an open circuit. Accordingly, when the flexible conduit 126 is deflected into the fluid reservoir 112, the fluid contacting the electrodes serve as a conductive body, such that the electrodes allow the fluid level or the presence of fluid held in the fluid reservoir 112 to be detected by a processing instrument operatively associated with the fluidic cartridge 100. For example, the processing instrument could detect the liquid level capacitively, by detecting a capacitive signal between the open circuit that changes when the flexible conduit 126 and electrodes 132a, 132b come in contact with liquid. In some examples, the electrodes disposed on the flexible conduit 126 serve as an electrical heater to heat the fluid held in the fluid reservoir 112. In some implementations, other electric components can be disposed in and/or on the flexible conduit 126 (e.g., a sensor, a MEMS device, etc.).

Figure 2:
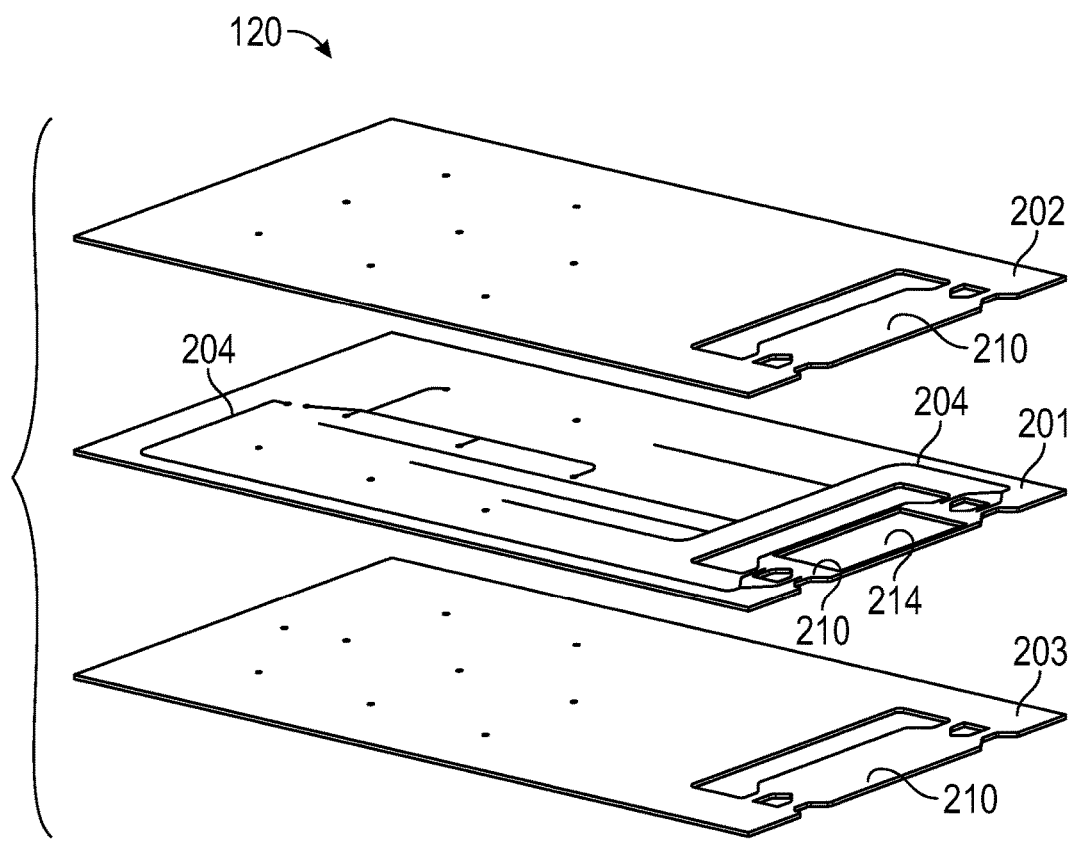
FIG. 2 is an exploded perspective view of three layers used to construct an example laminate fluidic circuit shown in FIG. 1.

FIGS. 2-5 show a three layer construction of the laminate fluidic circuit 120 according to the example shown in FIG. 1. As shown in FIG. 2, the laminate fluidic circuit 120 comprises a first layer 201, a second layer 202, and a third layer 203 superposed to each other. The first layer 201 is disposed between the second layer 202 and the third layer 203 and comprises one or more slots 204 formed through the first layer 201. In some examples, the first layer 201 can also, or in the alternative to the one or more slots 204, include channels, depressions, or other features formed in the first layer 201. In some examples, portions 210, 214 are trimmed at one end of each of the layers 201-203 to form the fluidic device 140. In some examples, each of the layers 201-203 comprises a polymeric material (e.g., plastic), such as polyethylene terepthalate (PET), polymethylmethacrylate (PMMA), polycarbonate, polyvinylchloride (PVC), polydimethylsiloxane (PDMS), cyclic olefin copolymer (COP), and the like.

Figure 3:
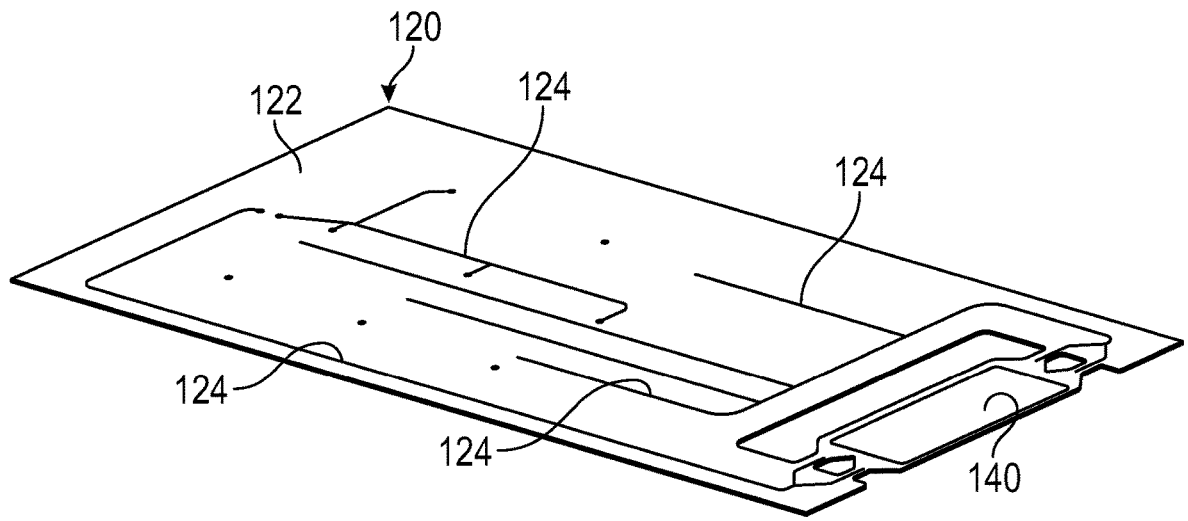
FIG. 3 is a perspective view of the three layers laminated together to form an example multilayer substrate shown in FIG. 1.

Referring to FIG. 3, the first, second, and third layers 201-203 are laminated together to form the substantially planar, multilayer substrate 122. In some examples, the first, second, and third layers 201-203 are laminated together by thermal bonding, solvent bonding, laser welding, or adhering the sides of the layers 201-203 to each other by applying for example, a pressure sensitive adhesive to the sides of the layers 201-203. After the layers 201-203 are laminated together, the second layer 202 and the third layer 203 enclose the slots 204 and/or other features formed in the first layer 201 to form the channels 124 defined within the multilayer substrate 122. In some examples, several channels 124 can be defined for each flexible conduit 126. As the layers 201-203 are laminated together, the trimmed portions 210, 214 are aligned to form the fluidic device 140 at one end of the multilayer substrate 122. In some implementations, the trimmed portions 210, 214 can be omitted.

Figure 4:
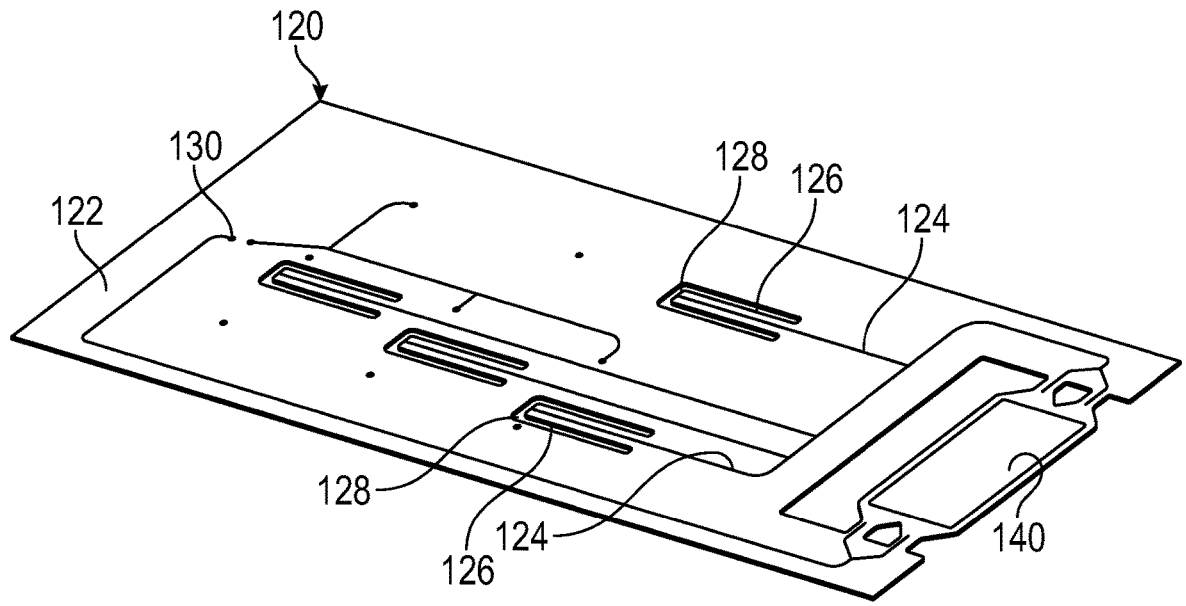
FIG. 4 is a perspective view of the example laminate fluidic circuit shown in FIG. 1, in which laminate fluidic circuit includes flexible conduits set at undeflected positions.

Referring to FIG. 4, selective portions of the multilayer substrate 122 encompassing an extent of a respective channel 124 are disrupted by forming cutouts 128 through the multilayer substrate 122. In the illustrative example, the cutouts 128 are shaped (e.g., U-shaped) to partially surround an extent (e.g., a terminal end) of the channel 124, such that the disrupted portions of the multilayer substrate 122 are partially separated from the remainder of the multilayer substrate 122, thereby forming the flexible conduits 126. Each flexible conduit 126 comprises the disrupted portion of the multilayer substrate 122 and the encompassed extent of its respective channel 124. As shown in FIG. 4, the flexible conduits 126 are set at undeflected positions, where the flexible conduits 126 remain substantially aligned (i.e., coplanar) with the multilayer substrate 122. In some instances, the flexible conduits 126 may be set at the undeflected positions while the laminate fluidic circuit 120 is transported or shipped separately from the tray 110 to an end user. In some examples, several channels 124 can be defined for each flexible conduit 126.

Figure 5:
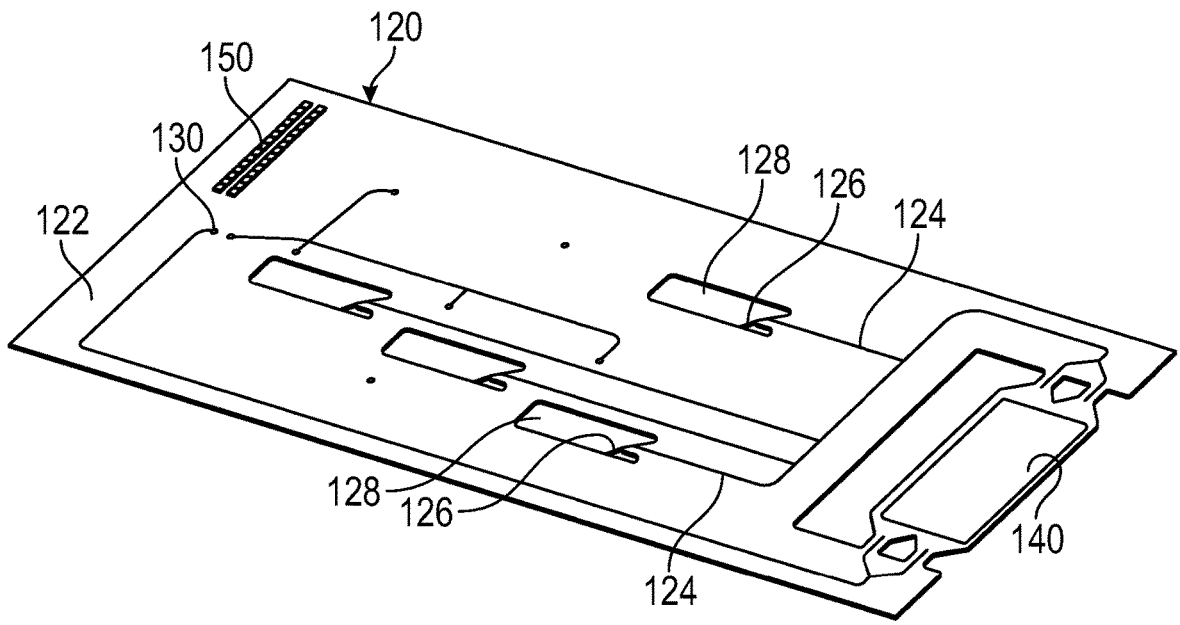
FIG. 5 is a perspective view of the example laminate fluidic circuit shown in FIG. 1, in which laminate fluidic circuit includes flexible conduits set at deflected positions.

Referring to FIG. 5, the flexible conduits 126 are set at deflected positions such that the disrupted portion of the multilayer substrate 122 and the encompassed extent of the channel 124 are inclined, curved, bent, or otherwise moved with respect to the remaining planar, multilayer substrate 122. The flexible conduits 126 may be set at the deflected position once the laminate fluidic circuit 120 is operatively mounted on the tray 110 to deliver fluid held in the fluid reservoirs 112 to the fluidic device 140.

Details of the channels 124 defined within the multilayer substrate 122 and the flexible conduit 126 partially disrupted from the remainder of the multilayer substrate 122 are shown in FIGS. 6-13.

Figure 9:
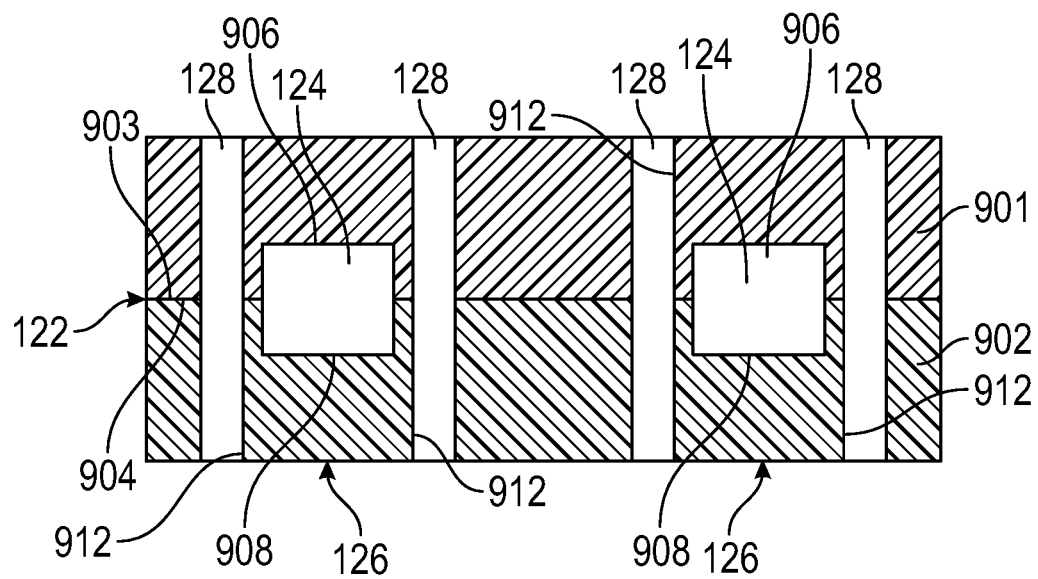
FIG. 9 is a schematic cross-sectional view of an example laminate fluidic circuit taken along line A-A in FIG. 6.
Figure 10:
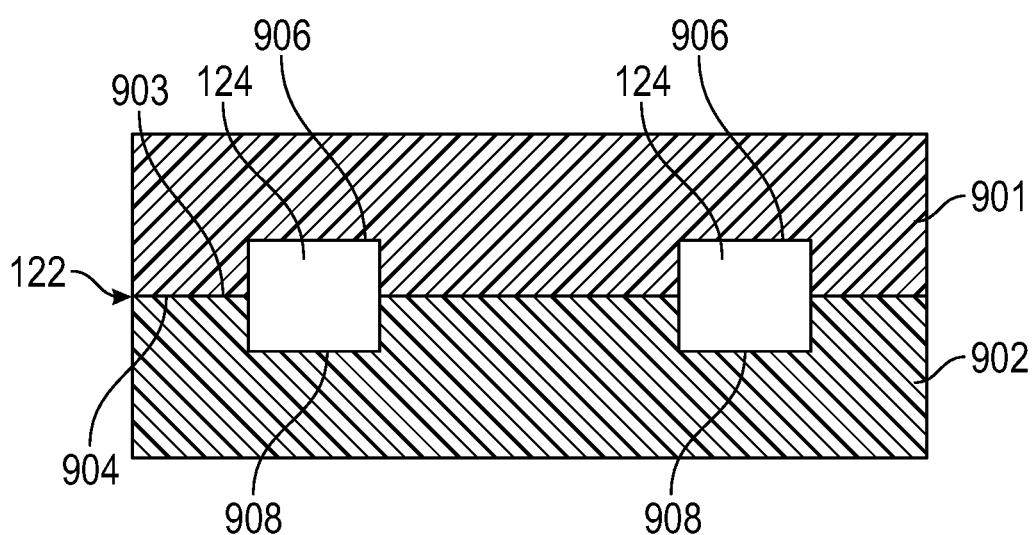
FIG. 10 is a schematic cross-sectional view of the example laminate fluidic circuit taken along line B-B in FIG. 6.

FIG. 6 shows a schematic partial top view of the laminate fluidic circuit 120, in which the flexible conduits 126 are formed by cutting cutouts 128 through the multilayer substrate 122. In some examples, several channels 124 can be defined for each flexible conduit 126. FIGS. 7 and 8 show a cross-sectional view of a three-layer construction of the multilayer substrate 122 taken along lines A-A and B-B, respectively, in FIG. 6. FIGS. 9 and 10 show a cross-section view of a two-layer construction of the multilayer substrate 122 taken along lines A-A and B-B, respectively, in FIG. 6.

As shown in FIGS. 7 and 8, for a three-layer construction of the multilayer substrate 122, the channel 124 is formed by cutting a slot 704 from an upper surface 706 of a layer 701 to a lower surface 708 of the first layer 701. The channel 124 is enclosed by securing a mating surface 705 of a second layer 702 to the upper surface 706 of the first layer 701 and a mating surface 707 of a third layer 703 to the lower surface 708 of the first layer 701. Referring to FIG. 7, each flexible conduit 126 is formed by cutting the cutout 128 through the first, second, and third layers 701-703. By cutting the cutout 128 through layers 701-703 of the multilayer substrate 122, sides 712 of the flexible conduit 126 are separated from the remainder of the multilayer substrate 122. In some examples, several channels 124 can be defined for each flexible conduit 126. Referring to FIG. 8, the channel 124 extends away from the flexible conduit 126 along the remainder of the multilayer substrate 122. As shown in FIG. 8, the channel 124 is defined by the slot 704 extending through the first layer 701 and enclosed by the mating surface 705 of the second layer 702 and the mating surface 707 of the third layer 703.

As shown in FIGS. 9 and 10, for a two-layer construction of the multilayer substrate 122, the channel 124 is formed by forming a first groove 906 along a mating surface 903 of a first layer 901 and a second groove 908 along a mating surface 904 of a second layer 902. The channel 124 is enclosed by securing the mating surface 903 of the first layer 901 to the mating surface 904 of the second layer 902 in a way that aligns the first groove 906 with the second groove 908 to define the channel 124. In some examples, the channel 124 may be formed by forming a groove along only one of the mating surfaces of the first and second layers 901, 902 and enclosing the groove with the mating surface of the other layer 901, 902. Referring to FIG. 9, the flexible conduit 126 is formed by cutting the cutout 128 through the first and second layers 901 and 902. By cutting the cutout 128 through layers 901, 902 of the multilayer substrate 122, sides 912 of the flexible conduit 126 are separated from the remainder of the multilayer substrate 122. In some examples, several channels 124 can be defined for each flexible conduit 126. Referring to FIG. 10, the channel 124 extends away from the flexible conduit 126 along the remainder of the multilayer substrate 122. As shown in FIG. 10, the channel 124 is defined by the aligned grooves 906, 908 of the first and second layers 901, 902.

Figure 11:
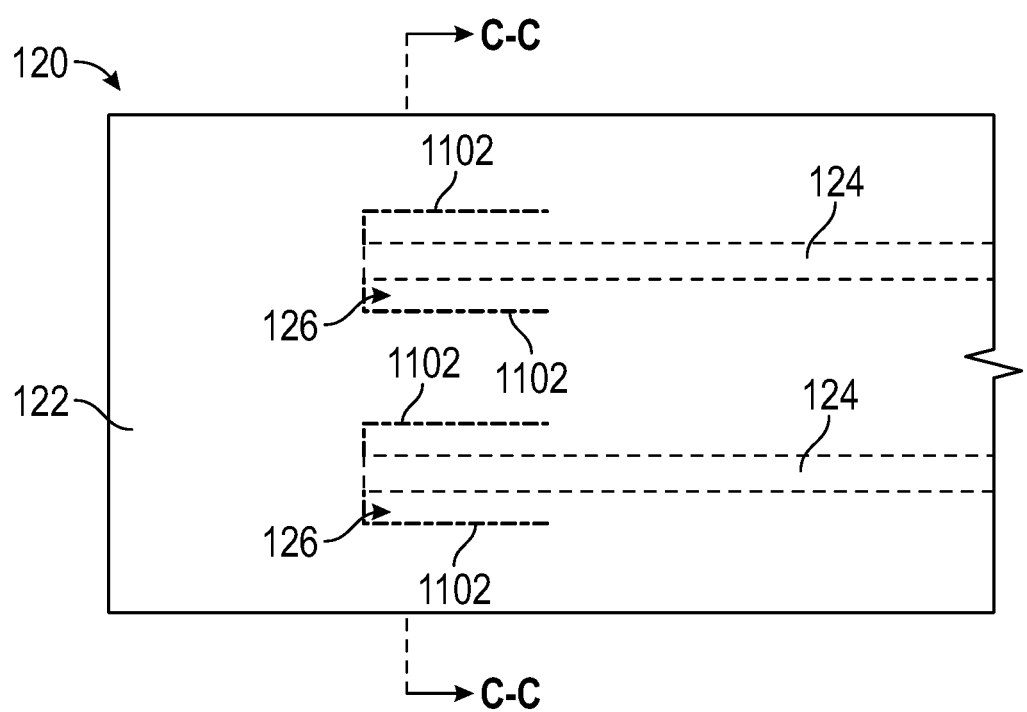
FIG. 11 is a schematic partial top view of an example laminate fluidic circuit comprising a multilayer substrate that includes flexible conduits formed by score lines.
Figure 12:
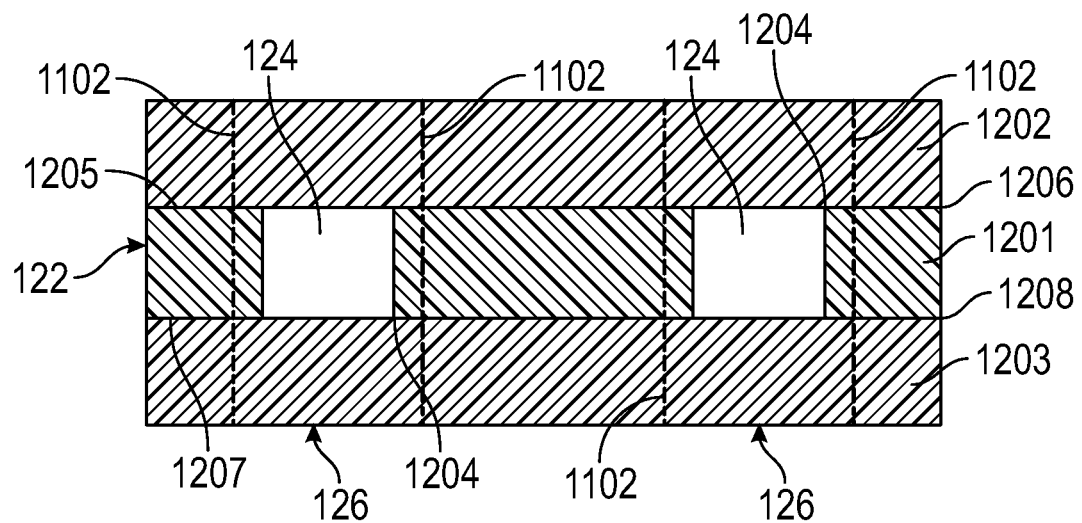
FIG. 12 is a schematic cross-sectional view of an example laminate fluidic circuit along line C-C in FIG. 11.
Figure 13:
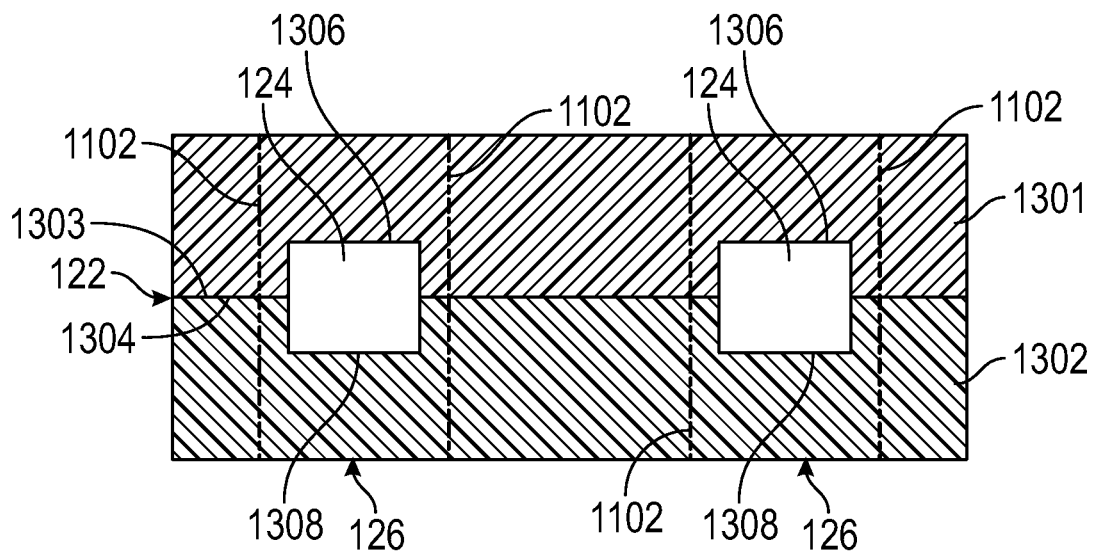
FIG. 13 is a schematic cross-sectional view of an example laminate fluidic circuit along line C-C in FIG. 11.

FIG. 11 shows a schematic partial top view of the laminate fluidic circuit 120 in which the flexible conduits 126 are formed by forming score lines 1102 in or through the multilayer substrate 122 and partially surrounding an extent (e.g., a terminal end) of the channel 124. In some implementations, the score lines 1102 may be perforations or other partial cuts, indentations, etc. formed in the laminate fluidic circuit 120. In some examples, several channels 124 can be defined for each flexible conduit 126. FIG. 12 shows a cross-sectional view of a three-layer construction of the multilayer substrate 122 taken along line C-C in FIG. 11. FIG. 13 shows a cross-section view of a two-layer construction of the multilayer substrate 122 taken along line C-C in FIG. 11.

As shown in FIG. 12, under the three-layer construction of the multilayer substrate 122, the channel 124 is formed by cutting a slot 1204 from an upper surface 1206 of a first layer 1201 to a lower surface 1208 of the first layer 1201. The channel 124 is enclosed by securing a mating surface 1205 of a second layer 1202 to an upper surface 1206 of the first layer 1201 and a mating surface 1207 of a third layer 1203 to a lower surface 1208 of the first layer 1201. The flexible conduit 126 is formed by forming a score line 1102 in the multilayer substrate 122, which, in an example, is formed through one or more of the first, second, and third layers 1201-1203. The score line 1102 may comprise a partial groove, a perforated line, a linear indent, or any other means that locally weakens the substrate 122 along the line 1102 and enables the portion of the multilayer substrate 122 partially surrounded by the score line 1102 to be controllably separated from the remainder of the substrate 122 upon the application of an external force, such that the score line 1102 defines the sides of the flexible conduit 126. In some examples, several channels 124 can be defined for each flexible conduit 126.

As shown in FIG. 13, under the two-layer construction of the multilayer substrate 122, the channel 124 is formed by forming a first groove 1306 along a mating surface 1303 of a first layer 1301 and a second groove 1308 along a mating surface 1304 of a second layer 1302. The channel 124 is enclosed by securing the mating surface 1303 of the first layer 1301 to the mating surface 1304 of the second layer 1304 in a way that aligns the first groove 1306 with the second groove 1308 to define the channel 124. The flexible conduit 126 is formed by forming a score line 1102 in the multilayer substrate 122, which, in an example, is formed through one or more of the first and second layers 1301, 1302. Again, the score line 1102 may comprise a partial groove, a perforated line, a linear indent, or any other means that locally weakens the substrate 122 along the line 1102 and enables the portion of the multilayer substrate 122 partially surrounded by the score line 1102 to be removed from the remainder of the substrate 122 upon the application of an external force, such that the score line 1102 defines the sides of the flexible conduit 126. In some examples, several channels 124 can be defined for each flexible conduit 126.

As shown in FIGS. 14 and 15, in some examples, the tray 110 comprises a first reservoir 1402 and one or more second reservoirs 1404 (three in the illustrated implementation) disposed within the first reservoir 1402. The first reservoir 1402 comprises a bottom 1410, a set of walls 1412 extending from the bottom 1410, and a flange 1414 projecting from the walls 1412 and surrounding the first reservoir 1402. The second reservoirs 1404 are formed by stamping a plate 1420, such that each second reservoir 1404 comprises a bottom 1422 recessed from the planar surface of the plate 1420 and a set of walls 1424 extending from the bottom 1422 to the planar surface of the plate 1420. The plate 1420 is disposed on top of the first reservoir 1402 and supported by the flange 1414, whereby the second reservoirs 1404 reside within the first reservoir 1402.

In some examples, the first reservoir 1402 holds a larger volume of fluid than each of the second reservoirs 1404. In some examples, the first reservoir 1402 holds a fluid, such as a hydration buffer or a wash solution, that is used more frequently or extensively than the types of fluid held in the second reservoirs 1404. In some examples, the second reservoir 1404 holds a lyophilized reagent that is configured to be transformed from a dry state to a liquid state through the introduction of hydration buffer stored in the first reservoir 1402. In some examples, the second reservoir 1404 may be empty while the tray 110 is being transported to its destination and when the tray 110 is initially connected to the multilayer substrate 122. In some examples, the empty second fluid reservoir 1404 may be used as a mixing well such that the empty second fluid reservoir 114 receives reagent fluid from two or more other fluid reservoirs during a fluid operation. In some examples, the empty second fluid reservoir 1404 may be used as a staging well (e.g., cache reservoir) such that the empty second fluid reservoir 114 holds an aliquot of a reagent fluid that is stored in another fluid reservoir during a fluid operation. In some examples, the second fluid reservoirs 1404 can contain liquid reagents that are sealed therein (e.g., sealed therein by a pierceable foil).

In some examples, the first reservoir 1402 is not fluidly connected to any of the flexible conduits 126, but is rather fluidly connected to the channels 124 through the port 130. In some examples, the tray 110 comprises a conduit 1406 connected to the port 130 of the laminate fluidic circuit 110 and extending into the first reservoir 1402 such that the conduit 1406 fluidly connects the first reservoir 1402 to the channels 124. In some examples, each second reservoir 1404 is disposed below a corresponding cutout 128 formed through the substrate 122 of the laminate fluidic circuit 120 and is fluidly connected to the channels 124 by a corresponding flexible conduit 126. In some examples, the first reservoir 1402 is fluidly connected to a flexible conduit 126.

Figure 16:
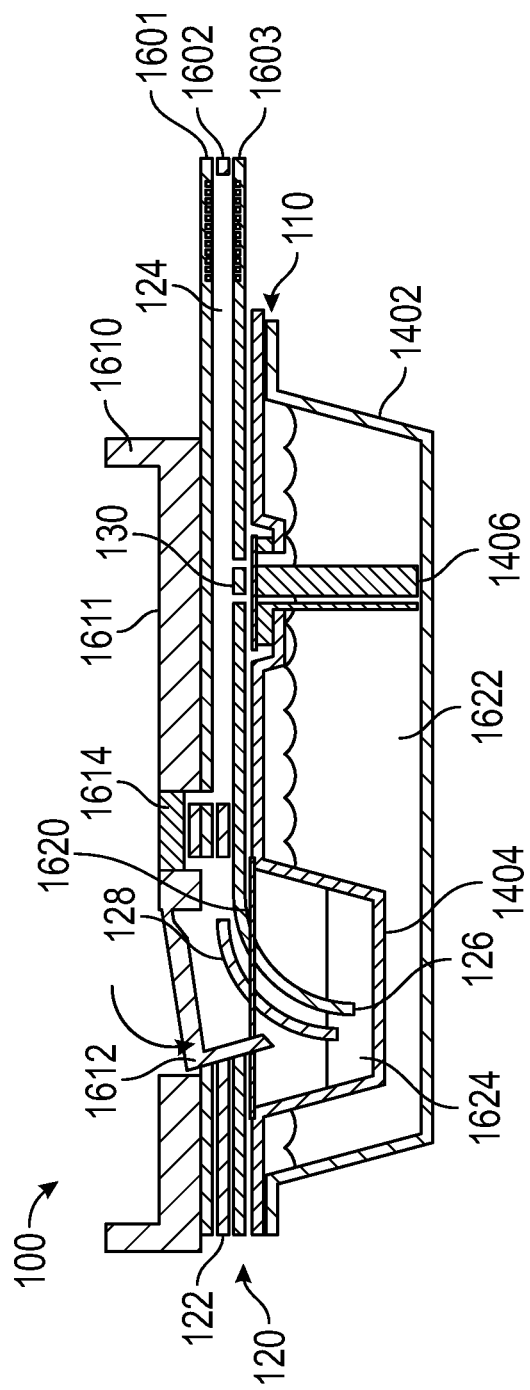
FIG. 16 is a schematic cross-sectional view of an example apparatus comprising a tray, a laminate fluidic circuit mounted on the tray, and a rigid cover disposed on the laminate fluidic circuit.

FIG. 16 shows a side cross-sectional view of a fluid cartridge 100 according to one example. In the illustrative example, the laminate fluidic circuit 120 comprises a first layer 1601, a second layer 1602, and a third layer 1603. The second layer 1602 is disposed between the first layer 1601 and the third layer 1603. The second layer 1602 comprises one or more slots that form the one or more channels 124 enclosed by the first layer 1601 and the third layer 1603.

Similar to the examples shown in FIGS. 2 and 3, the tray 110 of FIG. 16 comprises a first reservoir 1402 and a second reservoir 1404 disposed within the first reservoir 1402. The first reservoir 1402 may hold a hydration buffer fluid 1622 and is fluidly connected to the laminate fluidic circuit 120 by the conduit 1406 connected to the fluid port 130. The second reservoir 1404 may hold a lyophilized reagent 1624 in a dry state. The second reservoir 1404 may be sealed by a foil 1620 that covers an opening of the second fluid reservoir 1404 such that the foil 1620 prevents moisture from entering the second reservoir 1404, thereby maintaining the lyophilized reagent 1624 in the dry state. In some examples, the second fluid reservoir 1404 can contain a liquid reagent that is sealed therein (e.g., sealed therein by a pierceable foil 1620).

In various examples, as shown in FIG. 16, the fluidic cartridge 100 may comprise a rigid cover 1610 disposed on the laminate fluidic circuit 120 and opposite to the tray 110. In some examples, the rigid cover 1610 is comprised of an injection molded plastic material such that the rigid cover 1610 provides stiffness to multilayer substrate 122 of the laminate fluidic circuit 120.

In some examples, the rigid cover 1610 comprises a punch 1612 that is configured to be pivoted with respect to a planar surface 1611 of the cover 1610. When the cover 1610 is operatively mounted on the laminate fluidic circuit 120, the cover 1610 is aligned to the multilayer substrate 122 in a way that places the punch 1612 above at least a portion of a corresponding flexible conduit 126. With the cover 1610 is aligned on the multilayer substrate 122, the punch 1612 may be actuated (e.g., manually or by a machine) to deflect the flexible conduit 126 away from the multilayer substrate 122 and into a fluid reservoir, such as fluid reservoir 1404 in the present example. While deflecting the flexible conduit 126, the punch 1612 itself pierces or causes the flexible conduit 126 to pierce through the foil 1620 covering the second fluid reservoir 1404, such that the flexible conduit 126 is deflected through the pierced foil 1620 to fluidly connect the channels 124 to the second fluid reservoir 1404. In some examples, several channels 124 can be defined for each flexible conduit 126.

In various examples, the cover 1610 comprises a valve 1614 operatively associated with one of the channels 124 and the second fluid reservoir 1404 to control flow between the second fluid reservoir 1404 and its corresponding channel 124. In some examples, the valve 1614 is a pinch valve comprised of small rounded dip and may be compressed (e.g., with external pinch rods) to seal the corresponding channel 124.

Method for Assembling a Fluid Cartridge

Figure 17:
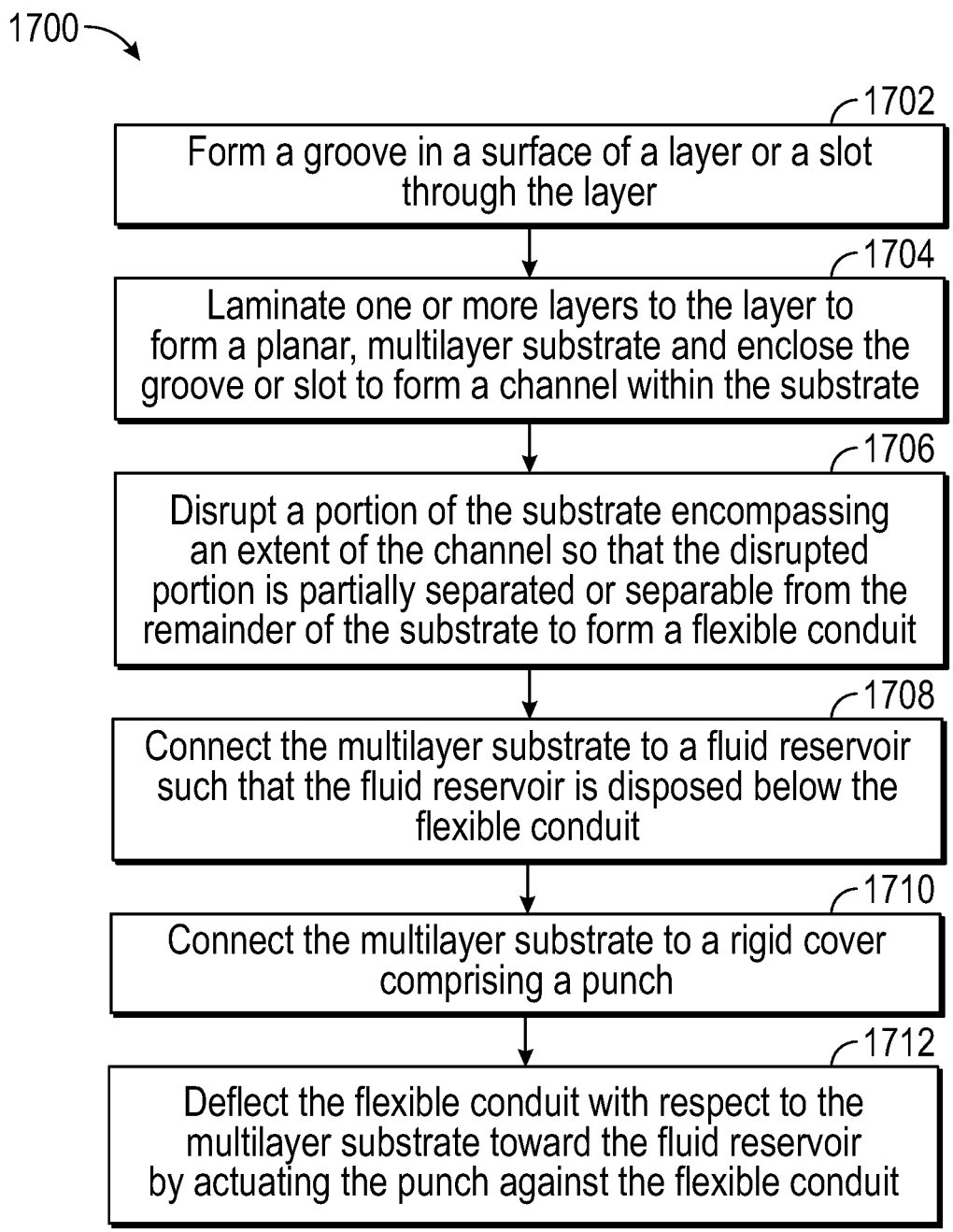
FIG. 17 is a flow chart of an example method of assembling a fluid cartridge comprising a laminate fluidic circuit and at least one fluid reservoir.

According to various examples, FIG. 17 illustrates a method 1700 for assembling a fluid cartridge 100 that comprises the laminate fluidic circuit 120 and at least one fluid reservoir 112.

As shown in FIG. 17, the method 1700 comprises a step 1702 of forming a groove in a surface of a layer of substrate material or a slot through the layer of substrate material. Referring to FIGS. 7, 8, and 12, under a three-layer construction of the multilayer substrate 122, step 1702 comprises cutting the slot 704, 1204 through layer 701, 1201. In some examples, the step 1702 of forming the slot 704, 1204 includes using a laser to cut through the layer 701, 1201. Referring to FIGS. 9, 10, and 13, under a two-layer construction of the multilayer substrate 122, step 1702 comprises forming the first groove 906, 1306 in the mating surface 903, 1303 of the first layer 901, 1301, and optionally, the second groove 908, 1308 in the mating surface 904, 1304 of a second layer 902, 1302.

Referring to FIG. 17, the method 1700 comprises a step 1704 of laminating one or more layers to the layer containing the groove or slot to form the substantially planar, multilayer substrate 122 and enclose the groove or slot to form the channel 124. In some examples, the layers comprise a polymer or plastic material, and step 1704 comprises adhesively or thermally bonding the various plastic layers together.

Referring to FIGS. 7, 8, and 12, under a three-layer construction of the multilayer substrate 122, step 1704 comprises laminating layer 702, 1202 (top layer) and layer 703, 1203 (bottom layer) to the layer 701, 1201 (middle layer) such that the layer 702, 1202 and the layer 703, 1203 enclose the slot 704, 1104 formed in the layer 701, 1201 to form the channel 124.

Referring to FIGS. 9, 10, and 13, under a two-layer construction of the multilayer substrate 122, step 1704 comprises laminating the first layer 901, 1301 to the second layer 902, 1302 such that the first groove 906, 1306 formed along the mating surface 903, 1303 of the first layer 901, 1301 is aligned with the second groove 908, 1308 formed along the mating surface 904, 1304 of the second layer 902, 1302 to form the channel 124.

Referring to FIG. 17, the method 1700 comprises a step 1706 of disrupting a portion of the multilayer substrate 122 encompassing an extent of the channel 124 so that the disrupted portion is partially separated or separable from the remainder of the multilayer substrate 122 to form the flexible conduit 126.

Referring to FIGS. 6-10, in some examples, the step 1706 of disrupting comprises forming a cutout 128 through one or more layers 701-703, 901-902 of the multilayer substrate 122. As shown in FIG. 6, each cutout 128 is shaped to partially surround the disrupted portion of the multilayer substrate 122 to form the flexible conduit 126. In some examples, the cutout 128 is formed by using a die cutter (not shown) that includes a punch and pressing the punch through the multilayer substrate 122 to form the cutout 128 or by a laser cutter that cuts grooves and cutouts in the multilayer substrate 122.

Referring to FIGS. 11-13, in some examples, the step 1706 of disrupting comprises forming the score line 1102 into the multilayer substrate 122. As shown in FIG. 11, each score line 1102 is shaped to partially circumscribe the disrupted portion of the multilayer substrate 122 encompassing the extent of the channel 124, such that the score line 1102 enables the disrupted portion of the multilayer substrate 122 to partially separate from the remainder of the multilayer substrate 122 upon the application of an external force to the disrupted portion of the substrate 122. In some implementations, perforations or other partial disruptions can be used in lieu of or in addition to the score line 1102.

Referring to FIG. 17, the method 1700 comprises a step 1708 of connecting the multilayer substrate 122 to the fluid reservoir 112 such that the fluid reservoir 112 is disposed below the flexible conduit 126. In some examples, the step 1708 of connecting comprises mounting the multilayer substrate 122 on the tray 110 that includes the plurality of fluid reservoirs 112, and step 1708 further comprises aligning the multilayer substrate 122 to the tray 110 in a way that places each flexible conduit 126 above at least a portion of the corresponding fluid reservoir 112. In some examples, the multilayer substrate 122 may be mounted to the tray 110 by various processes, such as adhering a bottom surface of the multilayer substrate 122 to a top surface of the tray 110 with a glue or pressure-sensitive adhesive or laser welding the multilayer substrate 122 to the top surface of the tray 110.

Referring to FIG. 17, the method 1700 comprises a step 1710 of connecting the multilayer substrate to the rigid cover 1610, which may include the punch 1612 configured to deflect the flexible conduit 126. In some examples, step 1710 further comprises aligning the cover 1610 with the multilayer substrate 122 in a way that places the punch 1612 above at least a portion of the flexible conduit 126.

Referring to FIG. 17, the method 1700 comprises a step 1712 of deflecting the flexible conduit 126 with respect to the multilayer substrate 122 toward the fluid reservoir 112, for example, by actuating the punch 1612 against the flexible conduit 126. In some examples, step 1712 further comprises piercing through the foil 1620 covering the fluid reservoir 112, such that the flexible conduit 126 is deflected through the pierced foil 1620 to fluidly connect the channel 124 within the multilayer substrate 122 to the fluid reservoir 112. Step 1712 could be done during a manufacturing process if the reservoir 112 is left dry during shipping and storage, or step 1712 could be performed by a processing instrument just prior to using the fluid cartridge 100.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Implementations

Implementation 1. An apparatus comprising: a fluid reservoir; and a laminate fluidic circuit positioned above the fluid reservoir, wherein the laminate fluidic circuit comprises: two or more layers laminated together to define a substantially planar substrate; one or more channels defined within the substrate, and a flexible conduit defined by a portion of the substrate encompassing an extent of at least one of the channels that is partially separated or separable from the remainder of the substrate, the flexible conduit comprising the portion of the substrate and the encompassed extent of the channel, wherein the flexible conduit is deflectable with respect to the planar substrate toward the fluid reservoir such that the flexible conduit fluidly connects the at least one channel to the fluid reservoir.

Implementation 2. The apparatus of implementation 1, wherein the substrate comprises a cutout formed through the substrate and partially surrounding the portion of the substrate encompassing the extent of the channel.

Implementation 3. The apparatus of implementation 1, wherein the substrate comprises a score line partially circumscribing the portion of the substrate encompassing the extent of the channel, wherein the score line enables the portion of the substrate to partially separate from the remainder of the substrate upon application of an external force to the portion of the substrate.

Implementation 4. The apparatus of implementation 1, wherein the two or more layers comprise a first layer, a second layer, and a third layer, and wherein the first layer is disposed between the second layer and the third layer and comprises at least one slot forming the one or more channels when covered on opposed sides by the second layer and the third layer.

Implementation 5. The apparatus of implementation 1, wherein the two or more layers comprise a first layer and a second layer laminated to the first layer, and wherein at least the first layer comprises at least one groove formed in a surface thereof and forming the one or more channels when covered by the second layer.

Implementation 6. The apparatus of implementation 1, wherein the substrate comprises two or more layers of a polymeric material adhesively or thermally bonded together.

Implementation 7. The apparatus of implementation 1 further comprising one or more electrodes disposed on the flexible conduit.

Implementation 8. The apparatus of implementation 7, wherein the one or more electrodes are for one or more of detecting a fluid level of a fluid held in the fluid reservoir, detecting a presence of a fluid held in the fluid reservoir, or heating a fluid held in the fluid reservoir.

Implementation 9. The apparatus of implementation 1 further comprising a valve operatively associated with at least one of the channels and the fluid reservoir to control flow between the fluid reservoir and at least one of the channels.

Implementation 10. The apparatus of implementation 1 further comprising a rigid cover disposed on the fluidic circuit and including a punch to deflect the flexible conduit away from the planar substrate and into the fluid reservoir.

Implementation 11. The apparatus of implementation 10 further comprising a pierceable foil covering an opening of the fluid reservoir such that the fluid reservoir is sealed, wherein the punch pierces the foil and deflects the flexible conduit through the pierced foil to fluidly connect the flexible conduit to the fluid reservoir.

Implementation 12. A method comprising: forming a channel in a first layer and laminating one or more layers to the first layer to form a planar, multilayer substrate such that the channel is defined within the substrate; and disrupting a portion of the substrate encompassing an extent of the channel so that the disrupted portion is partially separated or separable from the remainder of the substrate to form a flexible conduit comprising the portion of the substrate and the encompassed extent of the channel, wherein the flexible conduit is deflectable with respect to the planar substrate.

Implementation 13. The method of implementation 12, wherein the step of forming the channel in the first layer comprises forming a groove in a surface of the first layer, and the one or more layers laminated to the first layer encloses the groove.

Implementation 14. The method of implementation 12, wherein the step of forming the channel in the first layer comprises forming a slot through the first layer, and the one or more layers laminated to the first layer encloses the slot.

Implementation 15. The method of implementation 12, wherein the step of disrupting a portion of the substrate comprises forming a cutout through the substrate that partially surrounds the portion of the substrate encompassing the extent of the channel.

Implementation 16. The method of implementation 12, wherein the step of disrupting a portion of the substrate comprises forming a score line partially circumscribing the portion of the substrate encompassing the extent of the channel, wherein the score line enables the portion of the substrate to partially separate from the remainder of the substrate upon application of an external force to the portion of the substrate.

Implementation 17. The method of implementation 12, further comprising connecting the multilayer substrate to a fluid reservoir such that the fluid reservoir is disposed below the multilayer substrate and the flexible conduit while set at an undeflected position.

Implementation 18. The method of implementation 17, further comprising deflecting the flexible conduit with respect to the substrate toward the fluid reservoir, such that the encompassed extent of the channel in the flexible conduit fluidly connects the channel defined within the substrate to the fluid reservoir.

Implementation 19. The method of implementation 18, further comprising, after the step of deflecting the flexible conduit, aspirating a fluid held in the fluid reservoir through the encompassed extent of the channel in the flexible conduit to the channel defined in the substrate.

Implementation 20. The method of implementation 18, further comprising, after the step of deflecting the flexible conduit, introducing a fluid through the channel defined within the substrate and the encompassed extent of the channel in the flexible conduit and into the fluid reservoir.

Implementation 21. The method of implementation 12 further comprising connecting the multilayer substrate to a rigid cover.

Implementation 22. The method of implementation 18, wherein the rigid cover comprises a punch for deflecting the flexible conduit with respect to the planar substrate.

Implementation 23. The method of implementation 16, wherein the first layer and the one or more layers laminated to the first layer comprise two or more layers of a polymeric material, and the step of laminating the one or more layers to the first layer comprises adhesively or thermally bonding the layers together.

Implementation 24. The method of implementation 12, further comprising applying electrodes to a portion of the substrate forming the flexible conduit.

Implementation 25. An apparatus comprising: two or more layers laminated together to define a substantially planar substrate; one or more channels defined within the substrate, and a flexible conduit defined by a portion of the substrate encompassing an extent of at least one of the channels that is partially separated or separable from the remainder of the substrate, the flexible conduit comprising the portion of the substrate and the encompassed extent of the channel, wherein the flexible conduit is deflectable with respect to the planar substrate.

Implementation 26. The apparatus of implementation 25, wherein the two or more layers comprise a first layer, a second layer, and a third layer, and wherein the first layer is disposed between the second layer and the third layer and comprises at least one slot forming the one or more channels when covered on opposed sides by the second layer and the third layer.

Implementation 27. The apparatus of implementation 25, wherein the two or more layers comprise a first layer and a second layer laminated to the first layer, and wherein at least the first layer comprises at least one groove formed in a surface thereof and forming the one or more channels when covered by the second layer.

Implementation 28. The apparatus of implementation 25, further comprising: a fluid reservoir, and the substrate is positioned above the fluid reservoir such that the flexible conduit is deflectable toward the fluid reservoir to fluidly connect at least one channel defined within the substrate to the fluid reservoir; wherein the flexible conduit comprises a first channel for aspirating a fluid held in the fluid reservoir to the channel defined with the substrate and a second channel for introducing a fluid into the fluid reservoir.

Implementation 29. The apparatus of implementation 28, further comprising a sensor disposed on the flexible conduit for detecting a presence of a fluid held in the fluid reservoir.

Implementation 30. The apparatus of implementation 25, further comprising: one or more electrical contacts disposed along the multilayer substrate for receiving power from a power source; and one or more electrodes disposed on the flexible conduit and electrically connected to the one or more electrical contacts.

Implementation 31. The apparatus of implementation 25, wherein the flexible conduit is deflectable between an undeflected position and one or more deflected positions, wherein the flexible conduit is substantially co-planar with the substrate at the undeflected position, and the flexible conduit is inclined, curved, or bent with respect to the substrate at the one or more deflected positions.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:
1. An apparatus comprising:
a fluid reservoir; and
a laminate fluidic circuit positioned above the fluid reservoir, wherein the laminate fluidic circuit comprises:

two or more layers laminated together to define a substantially planar substrate;

one or more channels defined between two layers of the substrate, wherein each channel is defined by upper and lower walls and opposed side walls; and a flexible conduit defined by a portion of the substrate encompassing an extent of at least one of the channels, wherein the flexible conduit is partially separated or separable from the remainder of the substrate, the flexible conduit comprising the portion of the substrate and the encompassed extent of the channel, and wherein the substrate comprises a cutout formed through the substrate and partially surrounding the portion of the substrate encompassing the extent of the channel or the substrate comprises a score line partially circumscribing the portion of the substrate encompassing the extent of the channel, wherein the score line enables the portion of the substrate to partially separate from the remainder of the substrate upon application of an external force to the portion of the substrate and wherein the flexible conduit, when separated from the remainder of the substrate, is deflectable between an undeflected position above the fluid reservoir in which the flexible conduit is substantially coplanar with the planar substrate and a deflected position in which a portion of the flexible conduit is in the fluid reservoir, and wherein the upper and lower walls and the opposed side walls of the encompassed extent of the channel are deflectable with the flexible conduit and with respect to the planar substrate toward the fluid reservoir such that the flexible conduit fluidly connects the at least one channel to the fluid reservoir when the flexible conduit is in the deflected position.

2. The apparatus of claim 1, wherein the two or more layers comprise a first layer, a second layer, and a third layer, and wherein the first layer is disposed between the second layer and the third layer and comprises at least one slot forming the one or more channels when covered on opposed sides by the second layer and the third layer.

3. The apparatus of claim 1, wherein the two or more layers comprise a first layer and a second layer laminated to the first layer, and wherein at least the first layer comprises at least one groove formed in a surface thereof and forming the one or more channels when covered by the second layer.

4. The apparatus of claim 1, wherein the substrate comprises two or more layers of a polymeric material adhesively or thermally bonded together.

5. The apparatus of claim 1 further comprising one or more electrodes disposed on the flexible conduit.

6. The apparatus of claim 5, wherein the one or more electrodes are for one or more of detecting a fluid level of a fluid held in the fluid reservoir, detecting a presence of a fluid held in the fluid reservoir, or heating a fluid held in the fluid reservoir.

7. The apparatus of claim 1 further comprising a valve operatively associated with at least one of the channels and the fluid reservoir to control flow between the fluid reservoir and at least one of the channels.

8. The apparatus of claim 1 further comprising a rigid cover disposed on the fluidic circuit, the rigid cover including a punch to deflect the flexible conduit away from the planar substrate and into the fluid reservoir.

9. The apparatus of claim 8 further comprising a pierceable foil covering an opening of the fluid reservoir such that the fluid reservoir is sealed, wherein the punch pierces the foil and deflects the flexible conduit through the pierced foil to fluidly connect the flexible conduit to the fluid reservoir.

10. A method comprising:

forming a channel in a first layer and laminating one or more layers to the first layer to form a planar, multilayer substrate such that the channel is defined within the substrate, wherein each channel is defined by upper and lower walls and opposed side walls;

disrupting a portion of the substrate encompassing an extent of the channel so that the disrupted portion is partially separated or separable from the remainder of the substrate to form a flexible conduit comprising the portion of the substrate and the encompassed extent of the channel, wherein the flexible conduit is deflectable with respect to the planar substrate between an undeflected position above a fluid reservoir disposed below the multilayer substrate in which the flexible substrate is substantially coplanar with the planar substrate and a deflected position in which a portion of the flexible conduit is in the fluid reservoir; and deflecting the flexible conduit separated from the remainder of the substrate from the undeflected position to the deflected position to deflect the upper and lower walls and the opposed side walls of the extent of the channel encompassed by the flexible conduit with respect to the substrate toward the fluid reservoir, such that the encompassed extent of the channel in the flexible conduit fluidly connects the channel defined within the substrate to the fluid reservoir when the flexible conduit is in the deflected position, and wherein the step of disrupting a portion of the substrate comprises:

forming a cutout through the substrate that partially surrounds the portion of the substrate encompassing the extent of the channel, or forming a score line partially circumscribing the portion of the substrate encompassing the extent of the channel, wherein the score line enables the portion of the substrate to partially separate from the remainder of the substrate upon application of an external force to the portion of the substrate.

11. The method of claim 10, wherein the step of forming the channel in the first layer comprises forming a groove in a surface of the first layer, and the one or more layers laminated to the first layer encloses the groove.

12. The method of claim 10, wherein the step of forming the channel in the first layer comprises forming a slot through the first layer, and the one or more layers laminated to the first layer encloses the slot.

13. The method of claim 10, further comprising, after the step of deflecting the flexible conduit from the undeflected position to the deflected position to deflect, aspirating a fluid held in the fluid reservoir through the encompassed extent of the channel in the flexible conduit to the channel defined in the substrate.

14. The method of claim 10, further comprising, after the step of deflecting the flexible conduit from the undeflected position to the deflected position to deflect, introducing a fluid through the channel defined within the substrate and the encompassed extent of the channel in the flexible conduit and into the fluid reservoir.

15. The method of claim 10, further comprising connecting the multilayer substrate to a rigid cover.

16. The method of claim 15, wherein the rigid cover comprises a punch for deflecting the flexible conduit from the undeflected position to the deflected position to deflect.

17. The method of claim 10, wherein the first layer and the one or more layers laminated to the first layer comprise two or more layers of a polymeric material, and the step of laminating the one or more layers to the first layer comprises adhesively or thermally bonding the layers together.

18. The method of claim 10, further comprising applying electrodes to a portion of the substrate forming the flexible conduit.

\* \* \* \* \*